United States Patent

[11] 3,600,749

[72] Inventors Edmund Munk;
 Herbert Haas; Gerd Weinberg, all of
 Oberstenfeld, Germany
[21] Appl. No. 740,318
[22] Filed June 26, 1968
[45] Patented Aug. 24, 1971
[73] Assignee Furnier-und Sperrholzwerk J. F. Werz, Jr.
 K.G., Werzalit-Pressholzwerk
 Oberstenfeld, Wurttemberg, Germany

[54] APPARATUS FOR PRESSURE-MOLDING OF ARTICLES FROM A NONFLOWING MIXTURE OF COMMINUTED ORGANIC FIBROUS MATERIALS AND A HEAT-SETTING BINDER
 10 Claims, 4 Drawing Figs.

[52] U.S. Cl............................................. 18/16 R,
 264/122
[51] Int. Cl................................................. B30b 1/32
[50] Field of Search....................... 18/16 M, 16
 F, 17 W

[56] References Cited
 UNITED STATES PATENTS

| | | | |
|---|---|---|---|
| 2,301,125 | 11/1942 | Kramp et al. | 18/17 W |
| 2,393,130 | 1/1946 | Toulmin | 18/16.5 X |
| 2,404,559 | 7/1946 | Ashbaugh | 18/16 F X |
| 2,431,095 | 11/1947 | Tucker | 18/16.5 X |
| 3,366,368 | 1/1968 | Hibbing | 18/16.5 X |

FOREIGN PATENTS

| 928,356 | 6/1963 | Great Britain | 18/30 LKF |
|---|---|---|---|

*Primary Examiner*—J Howard Flint, Jr.
*Attorneys*—Leslie G. Noller, John M. Crawford and Kenneth W. Vernon ABSTRACT: A molding apparatus in which the forward and return strokes of the press punch are carried out in three steps so that, after one molding operation has been completed, the punch is retracted enough that the finished article may be removed from the mold without difficulty, thereafter the punch is advanced by a second movement for such a distance that the space between the molding surface of the punch and the core will have the proper width for receiving the exact amount of mixture which is required for compressing to the desired thickness of the mold article, and then finally by a third movement of the punch the filled-in mixture is compressed to the desired thickness of the mold article while the mold may be heated at the same time for curing the compressed material.

The application also discloses an apparatus in which the punch is operated by one or more hydraulic cylinders and pistons for fully retracting the punch and by one of more hydraulic cylinders and pistons for advancing the punch from the retracted position to the filling position.

Patented Aug. 24, 1971

INVENTOR
Edmund Munk
Herbert Haas
Gerd Weinberg

BY
ATTORNEY

APPARATUS FOR PRESSURE-MOLDING OF ARTICLES FROM A NONFLOWING MIXTURE OF COMMINUTED ORGANIC FIBROUS MATERIALS AND A HEAT-SETTING BINDER

BACKGROUND OF THE INVENTION

The present invention relates to the production of pressure-molded articles, for example, of a hollow shape, which at the end of the molding operation are located in such a position within the mold that the lower edge of the article projects toward one side considerably more than the upper edge. In order to permit such a molded article to be removed from the mold, it becomes necessary to retract the punch or punches of the press for such a distance that during the removal the lower edge of the article will pass the upper edge of the punch without coming in contact therewith. The difficulty then occurs that the distance between the core and the punch of the molding press will be considerably larger than the width of the chamber which is necessary for taking up the exact amount of the molding mixture which is required for compressing the mixture to the desired thickness of the final article.

SUMMARY OF THE INVENTION

In order to permit the production also of such molded articles and especially to permit the entire operation to be carried out automatically, the present invention provides that the forward and return strokes of the punch of the press be carried out in three steps so that, after one molding operation has been completed, the punch is so far retracted that the finished article may be removed from the mold without difficulty, that thereafter the punch is advanced by a second movement for such a distance that the space between the molding surface of the punch and the core will have the proper width for receiving the exact amount of mixture which is required for compressing it to the desired thickness of the molded article, and that finally by a third movement of the punch the filled-in mixture is compressed to the desired thickness of the molded article while the mold may be heated at the same time for curing the compressed material.

The invention further provides a mold which is designed so that each punch to be considered is operatively associated with at least one but preferably two or more hydraulic cylinders and pistons for fully retracting the punch and with at least one but preferably two or more hydraulic cylinders and pistons for advancing the punch from the retracted position to the filling position. These cylinders are mounted on the respective end plate of the mold and while the pistons of the retracting cylinders are positively connected to the punch, those of the other cylinders which are hereafter called the filling cylinders merely abut against the punch and execute a stroke of such a length that at the end of the stroke the front surface of the punch will be spaced at such a distance from the stationary surface of the mold or the core therein that a chamber remains which has a capacity exactly equal to the volume of the molding mixture which is to be compressed. Aside from these retracting and filling cylinders and pistons, the mold is provided with at least one pressure cylinder of the usual type and construction which preferably moves the punch only forwardly so as to carry out the actual molding operation, that is, the movement of the punch from the filling position to the position in which the material is compressed to the desired thickness. It is also possible to design the filling cylinder and piston so as to permit the end position of the punch for the filling operation to be adjustable by varying the length of the stroke of this piston. Furthermore, means may also be provided for limiting the extent of the retracting stroke of the punch.

The features and advantages of the present invention will become more clearly apparent from the following detailed description which is to be read with reference to the accompanying drawings, in which.

DESCRIPTION OF THE PREFERRED EMBODIMENTS

Figure 1:
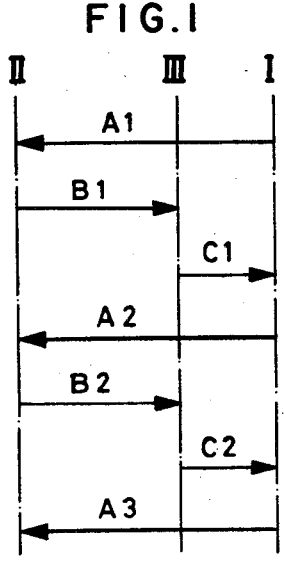
FIG. 1 shows a graphic illustration of the successive movements of the press punch.

As already mentioned above, the press punch moves in three phases, as illustrated diagrammatically in FIG. 1. After each pressing operation has been completed, the punch will be located in the position as indicated by the dot-and-dash line I.

In order to permit the completely molded body to be removed from the mold, the punch is retracted to such an extent in the direction of the arrow A1 that the molded body can be removed from the mold without difficulty, for example, in the upward direction. The punch will then be in the position II. After the molded body has been removed from the mold, the punch is moved inwardly in the direction of the arrow B1 from its retracted position II to the filling position III. In this position III, the space between the pressure surface of the punch and the core will be of such a size that the exact amount of the molding mixture may be filled therein which is required for producing the desired product. As soon as the punch reaches the filling position III, the mixture to be compressed is filled into this space and thereupon the punch is moved in the direction of the arrow C1 to the position I and thereby carries out the actual molding operation. The completion of the molding operation also completes one cycle of the movements of the punch and the individual steps are thereafter repeated in the following order:

A2 = Retracting of the punch from the mold;
II = Removal of the molded body;
B2 = Moving the punch up to the filling position;
III = Filling the mold;
C2 = Carrying out the molding operation;
I = Position of the punch at the end of the molding operation.

Figure 2:
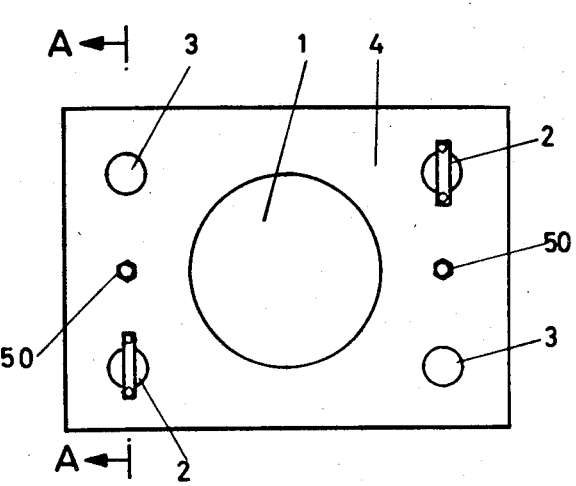
FIG. 2 shows an elevation of the edge plate of the press, as seen in the pressing direction, together with the different cylinders which are mounted thereon.

FIG. 2 illustrates one embodiment of a lateral end plate 4 of the press on which the main pressure cylinder 1 for carrying out the molding operation as well as two diagonally opposite retracting cylinders 2 and two likewise diagonally opposite cylinders 3 for moving the punch to the position in which the filling operation is carried out. All of these cylinders are so-called plunger cylinders in which the pistons or plungers are only acted upon from one side.

Figure 3:
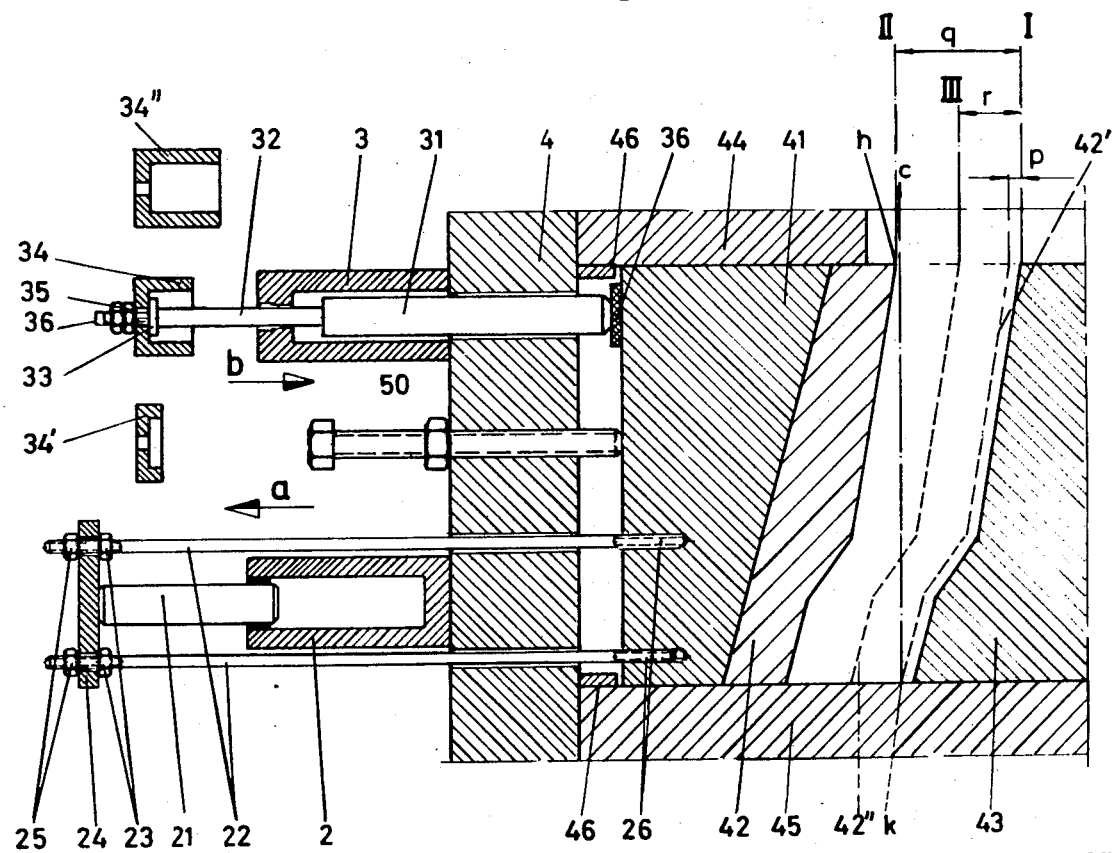
FIG. 3 shows an enlarged cross section which is taken along the line A—A in FIG. 2 in the direction of the arrows.

FIG. 3 shows a cross section of the end plate 4 and of the cylinders 2 and 3. Since this is a vertical section which is taken along the dot-and-dash line A—A and is seen in the direction of the arrows in FIG. 2, the main press cylinder 1 cannot be seen in FIG. 3.

In the particular example as illustrated it is assumed that molding tools 42 of different shapes may be removably mounted on the horizontally reciprocating punch 41 so as to be exchanged for each other. The core 43 which is mounted on the base plate 45 has a shape corresponding to that of the tool 42 and may therefore likewise be exchanged for one of another shape. The flat upper sliding surface of punch 41 is indicated at 44.

At the end of the molding operation, the molding surface of the molding tool 42 on punch 41 will be located in the position as indicated by the dotted line 42'. Consequently, the molded body will then have a thickness $p$. In order to permit this molded body to be removed in the upward direction from the mold, it is necessary to retract the punch 41 to such an extent that the lower edge $k$ of the molded body, which during the removal moves upwardly in the direction of the arrow along the dot-and-dash line $c$, will pass the upper edge $h$ of the molding tool 42 without coming in contact therewith.

Punch 41 must therefore be retracted to the position as indicated in full lines. The space $q$ between the molding tool 42 and the core 43 will then, however, be larger than the space which is necessary for receiving the required amount of the molding mixture which is to be compressed. After the molded body has been removed from the mold, it is therefore necessary again to move the punch 41 forwardly for such a distance that this space will have the proper size so as to permit the accurate amount of molding material to be filled in which is required for producing the particular product. The molding surface of tool 42 will then be in the position as indicated by the dotted line 42″, in which this surface is spaced from the core 43 at a distance r. The different positions of the front surface of the molding tool 42 correspond to the position I, II, and III as indicated in FIG. 1 and are equally marked in FIG. 3.

As illustrated particularly in FIG. 3, the lateral end plate 4 of the press carries the retracting cylinder 2, the piston 21 of which is movable only in the direction of the arrow a, and acts upon a crossbar 24 which, in turn, acts upon a pair of draw rods 22 which are secured to the punch 41 by screw threads 26. Crossbar 24 is secured to the draw rods 22 by means of nuts 25 which clamp the crossbar against the flanges 23 on the draw rods. When piston 21 is retracted from cylinder 2, for example, by hydraulic pressure acting upon the inner end of the piston, it will take along the punch 41 by means of the draw rods 22. This movement is limited by the stops 46 which determine the farthest outward position to which the piston 46 may be moved. Of course, this end position may also be made adjustable by suitable means, for example, by setscrews 50 which may be provided in plate 4.

For moving the punch 41 from the retracted position II to the filling position III, another cylinder 3 is provided and mounted on plate 4. The piston 31 of this cylinder extends through a bore in plate 4 and presses upon a pressure plate 36 on the punch 41. Cylinder 3 is mounted in such a position that its piston 31 may be moved in the direction of the arrow b and act through the pressure plate 36 in such a manner upon the punch 41 that the latter together with the molding tool 42 will be moved to the position III. For limiting this stroke, the rear end of piston 31 carries a piston rod 32 which is slidable within the rear end of the cylinder and projects from the latter in the direction opposite to that of its movement b. On its free end, piston rod 32 is provided with a flange 33 and a screw thread 36. On this flange 33 different exchangeable stop members 34, 34′, or 34″ may be mounted which are preferably cup-shaped and have a hole in their bottom so as to permit the respective stop member to be slipped over the end of piston rod 32 and to be clamped against the flange 33 by a nut 35 in such a manner that the open side of the respective cup-shaped stop member 34, 34′ or 34″ faces the end wall of the cylinder 3 and its rim is adapted to abut against this end wall so as to stop the forward movement of piston 31 and punch 41 when the molding surface of tool 42 has reached the desired position III. The length of the inward stroke and the inner end position III of the molding tool 42 are therefore determined by the length of the cylindrical part of the cup-shaped stop member 34, 34′, or 34″.

After the punch 41 together with the molding tool 42 has been moved to the filling position III, the space between the front surface of core 43 and the molding surface 42″ which has a width in accordance with the distance r may be filled with the molding material. When this filling operation is completed, the actual molding operation will take place by means of the main pressure cylinder 1, as indicated in FIG. 2, while at the same time, if desired, the mold may be heated. During this movement, punch 41 will take along the piston 21 of the retracting cylinder 2 by means of the draw rods 21 until the punch reaches its final molding position, while piston 31 will remain in the position to which it was previously moved for shifting the punch 41 to the filling position III since punch 41 will then disengage from the end of piston 31.

The foregoing description of FIG. 3 only relates to one side of the end plate 4 and of punch 41. However, since diagonally to the retracting cylinder 2 and also diagonally to the filling cylinder 3 another retracting cylinder and another filling cylinder are provided, punch 41 will always be actuated symmetrically so that no binding or wedging effect will occur.

Figure 4:
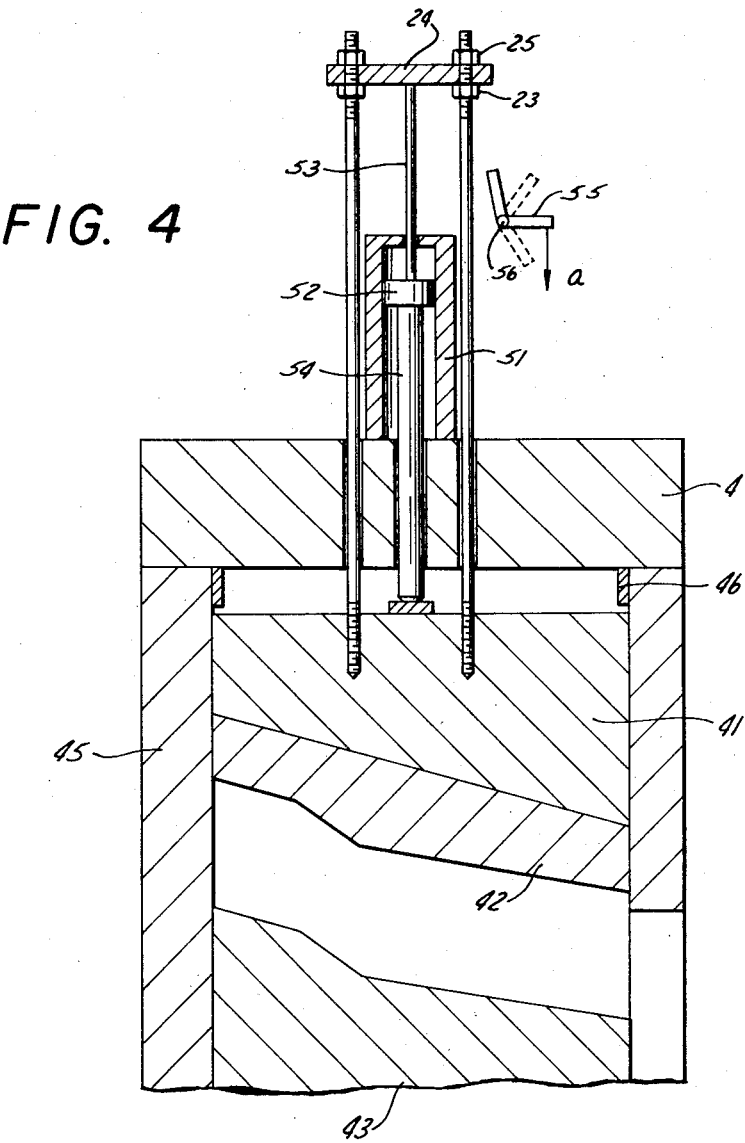
FIG. 4 shows an enlarged cross section similar to FIG. 3 of a modified embodiment.

Of course, the particular embodiment of the apparatus as above described is merely an example and may be modified considerably. Thus, for example, instead of providing retracting and filling cylinders the pistons of which are moved hydraulically in only one direction, it is also possible to move these pistons hydraulically in both directions, in which case it may be possible to carry out the retracting movements of the punch as well as its forward movements to the filling position by means of the same cylinders and pistons. Such a modification is shown in FIG. 4 in which a double-acting piston 52 is arranged in the cylinder 51 which is connected at one end to the end plate 4. Of course in this modification it is necessary to provide suitable means, for example, in the form of a stop lever 55 pivotable about a pivot 56 which insure that the forward movement of the punch will be stopped when it reaches the filling position and which will be rendered inoperative when the filling operation is completed so that during the molding operation the piston or pistons which also serve for retracting the punch will be taken along to the final molding position. The piston 52 of the double-acting cylinder 51 may then be provided similarly as the piston 31 as previously described with a piston rod 53 which extends through the end wall of the cylinder and the free end of which may be rigidly connected by a crossbar 24 and draw rods to the punch 41 while a reduced diameter portion 54 of the piston extends in direction opposite to the piston rod 53 into engagement with the punch 41. The releasable and preferably adjustable device for limiting the stroke of the punch for the filling operation may then be mounted either on the mentioned piston rod or on the end wall of the cylinder. This device may be designed so as to be released or disengaged when the main pressure cylinder is put under pressure, while it may again be engaged automatically during the retracting movement of the punch. For limiting the retracting stroke, it is also possible to provide means different from those as described, for example, in the form of spacing elements or the like.

What is claimed is:

1. A compression molding apparatus for producing pressure-molded articles, especially of hollow shape, from a nonflowing mixture consisting of comminuted particles and a binder, said apparatus comprising a stationary mold part having an end wall and a peripheral wall and being provided in said peripheral wall with an opening for feeding material to be compressed into the interior of said stationary mold part and for removing the molded articles therefrom; a core extending in the region of said opening transversely through said stationary mold part and having at the end thereof distant from said opening a dimension greater than at the other end; at least one punch extending transversely through said stationary mold part in engagement with said peripheral wall between said end wall and said core and reciprocable toward and away from the latter, said punch having a pressure face facing said core; and means cooperating with said punch for moving the same in a first direction from a closed position in which said pressure face is closely adjacent said core so as to compress material between said pressure face and said core to a finished article of desired wall thickness and density to an open position permitting removal of said finished article through said opening, for moving said punch in the opposite direction from said open position to an intermediate filling position in which said pressure face is spaced from said core to define with the latter in said stationary mold part a volume for receiving material through said opening which, when compressed in said closed position of said punch, will form said article, and from said intermediate filling position to said closed end position.

2. An apparatus as defined in claim 1, wherein said means for moving said punch comprise fluid-operated cylinder and piston means.

3. An apparatus as defined in claim 2, wherein said cylinder and piston means comprise at least one cylinder fixedly mounted on said end wall.

4. An apparatus as defined in claim 3, wherein said cylinder and piston means comprise three single-acting cylinder and piston means each having a cylinder mounted on said end wall and a piston reciprocable therein and having only one end face acted upon by pressure fluid fed into the cylinder thereof, one of said cylinder and piston means serves for moving said punch from said closed to said open position and has a piston movable, when acted upon by pressure fluid, in the direction away from said core and means for connecting said piston to said punch, the second of said cylinder and piston means serves to move said punch from said open to said intermediate position and has a piston cooperating with said punch and being movable, when acted upon by pressure fluid in a direction toward said core through a stroke of such a size when the piston is in its final position, the punch will be located in said intermediate position, and the third of said piston and cylinder means serves to move said punch from said intermediate to said closed position.

5. An apparatus as defined in claim 4, and including means cooperating with the piston of said second cylinder and piston means for limiting the inward stroke of the latter.

6. An apparatus as defined in claim 4, wherein said third cylinder and piston means has a diameter greater than that of said first and second cylinder and piston means.

7. An apparatus as defined in claim 4, wherein said means for connecting said piston of said one cylinder and piston means to said punch comprise a crossbar abutting against the other end face of said piston and a pair of draw rods having opposite ends respectively connected to said cross bar and said punch and extending through openings in said end wall.

8. An apparatus as defined in claim 5, wherein said piston of said second cylinder and piston means has a first piston rod which extends with an end portion thereof through an opening in said end wall to abut against said punch and a second piston rod projecting in the opposite direction through and beyond the cylinder of said second cylinder and piston means, and wherein said means for limiting the inward stroke of said piston comprise a plurality of stop means of different thickness selectively connectable to the outer end of said second piston rod.

9. An apparatus as defined in claim 4, and including adjustable stroke-limiting means for limiting the extent of travel of said punch.

10. An apparatus as defined in claim 2, wherein said means for moving said punch comprise at least one double-acting cylinder and piston means having a cylinder mounted with one end thereof sn said end wall, a piston reciprocable in said cylinder, a first piston rod fixed to said piston and projecting through an opening in said end wall into abutment with a face of said punch opposite said pressure face, a second piston rod projecting through and beyond the other end of said cylinder, a crossbar abutting against the outer end of said second piston rod, a pair of draw rods having opposite ends respectively connected to said crossbar and said piston and stop means cooperating with said second piston rod and being movable between an active position limiting the stroke of said piston to move said punch to and to maintain the same in said intermediate position and an inactive position permitting movement of said punch by said piston means to said closed position.